Feb. 13, 1968     P. D. LEVERING     3,368,430
STUD DRIVER AND RELEASE TOOLS
Filed March 7, 1966

INVENTOR
PAUL DUDLEY LEVERING
BY *Harry C. Liberto*
ATTORNEY

United States Patent Office 3,368,430
Patented Feb. 13, 1968

3,368,430
STUD DRIVER AND RELEASE TOOLS
Paul Dudley Levering, Siloam Springs, Ark., assignor to American Steel and Pump Corporation, Tulsa, Okla., a corporation of Delaware
Filed Mar. 7, 1966, Ser. No. 532,366
6 Claims. (Cl. 81—53)

ABSTRACT OF THE DISCLOSURE

The invention relates to a stud driving and removing device involving driving and driven sleeve coupler members having initially free limited relative rotation to provide longitudinal displacement of a stud end thrust element to release or hold the stud and momentarily thereafter effecting rotation thereof in unison to accomplish stud driving or removal depending upon the direction of rotation in relation to the pitch of the stud threads and the oppositely inclined threads of the end thrust element having a different thread pitch than the studs to be driven or removed therewith.

---

This invention relates to a stud driver and release tool and more particularly to stud engaging and disengaging driver tools that automatically respond to the direction of rotation in serving as stud engaging and disengaging mechanisms.

It contemplates more especially the provision of novel stud driving tools which effectively hold studs more tightly than the binding engagement thereof in the workpiece, and to automatically effect the positive release thereof by mere reversal of the direction of driver rotation which eliminates stud end pressure engagement and thread friction between the stud and driver.

It is well known that studs are usually threaded at both ends, and in some instances the threads differ with each other. The coarser of the threaded ends are usually in the workpiece so that the stud driver engages the finer of the stud threads which locks more securely therewith owing to the difference of thread pitch which accentuates the problem of stud release. This disadvantage is overcome with the teachings of the present invention by providing positive release means in combination with thread engaging means so that both engagement and disengagement may be effectively attained.

One object of the present invention is to provide an improved stud driving and release tool that responds to both functions by the directional rotation thereof.

Another object is to provide an improved stud driving tool which positively engages and effectively disengages studs more effectively through a functional stud end engaging element that is operative in one direction of rotation and inoperative in an opposite rotary direction.

Still another object is to provide a stud driver with a moveable stud engaging element combined therewith to become operative in a tightening direction of stud turning and inoperative in an opposite direction of rotation for both positive engagement and positive release in relation to the stud depending upon the direction of rotation.

A further object is to provide an improved stud turning tool which threadedly and axially engages studs for tightening in one direction of rotation and positively releases itself from stud end engagement in an opposite direction of rotation.

A still further object is to provide a stud turning tool with a displaceable axial engageable member combined therewith to respond to directional rotation in effecting its displaceable position for engagement and release relative to the stud end involved therewith.

Still a further object is to provide a stud turning device having a threadedly displaceable axial stud engageable element which renders the tightening engagement thereof more effective and responds to an opposite turning movement in the positive release of the stud for removal therefrom.

Other objects and advantages will appear from the following description of an illustrated embodiment of the present invention.

Figure 1:
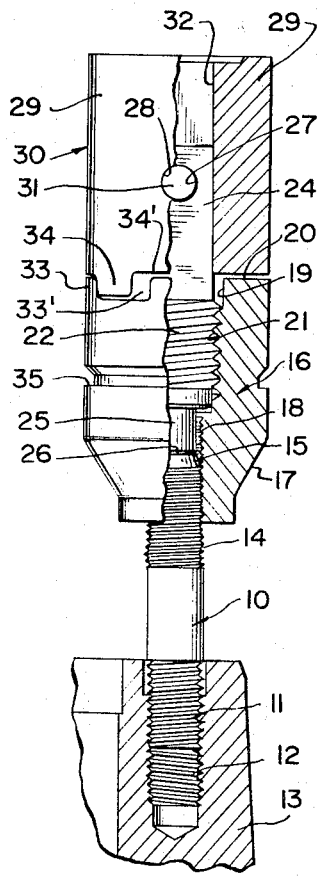
FIGURE 1 is a fragmentary sectional view in elevation of a stud in engagement with a workpiece therebelow and a stud turning tool above which embodies teachings of the present invention, parts thereof being broken away and shown in section to clarify the showing.
Figure 2:
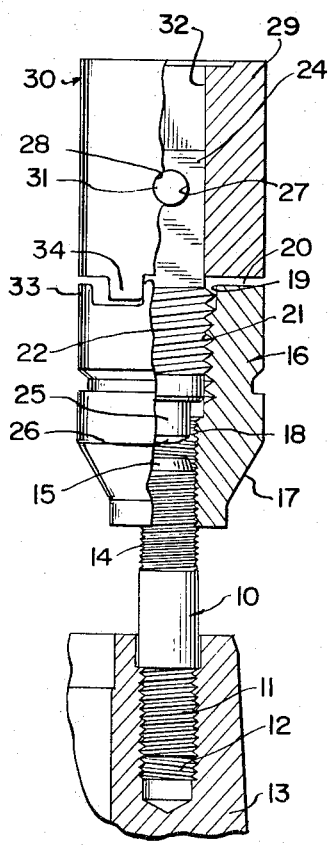
FIGURE 2 is a view similar to FIGURE 1, but with the stud turning tool rotated in a direction opposite to stud tightening and showing the stud end released from an axial engaging member during the removal operation of the stud driving tool or device.

The structure selected for illustration is not intended to serve as a limitation upon the scope or teachings of the invention, but is merely illustrative thereof. There may be considerable variations and adaptations of all or part of the teachings depending upon the dictates of commercial practice. The present invention is exemplified by a stud 10 of conventional construction having a standard machine thread 11 complemental to a threaded bore 12 provided in a workpiece 13 which provides the environment of use for a stud driving device to be hereinafter described. The stud 10 usually has a coarser thread 11 intended for engagement with the workpiece 13 of any desired construction and purpose. The other end 14 usually, though not necessarily, is provided with a finer thread which preferably terminates in a chamfered end 15 onto which any suitable fastener is turned tight to hold suitable parts assembled with the workpiece 13 through the medium of the stud 10.

Figure 5:
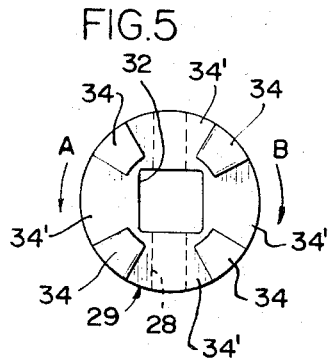
FIGURE 5 is a bottom end view of the clutching drive member shown assembled in FIGURES 1 and 2 of the drawing.

A stud driver is usually employed to engage and turn the stud 10 in tight engagement with the workpiece 13, and with a standard thread the tightening direction of rotation is in a counterclockwise direction indicated by arrow (A) when viewed from the bottom of the driving tool as will presently appear from a description thereof. Loosening of the stud would be accomplished by the rotation of the driving tool in an opposite direction indicated by arrow (B) in FIGURE 5. The driving tool comprises, in this instance, a driven tubular member 16 of generally cylindrical shape having a lower tapered end 17 which is interiorly bored axially and threaded as at 18 as a complement of the free extremity 14 of the stud 10. The threaded axial bore 18 of the driven member 17 communicates with an enlarged axial chamber 19 that extends through to the opposite or upper end 20 thereof to provide a threaded interior bore 21 of much coarser pitch than the threads 11–14 on the stud ends.

Figure 6:
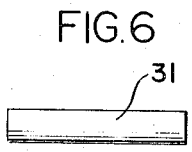
FIGURE 6 is a side view in elevation of a retaining pin used to retain the clutching drive member assembled with the axial engaging and stud release member or element as shown in FIGURES 1 and 2.
Figure 7:
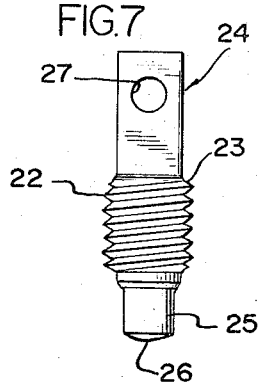
FIGURE 7 is a front view in elevation of the axial engaging and stud release element shown assembled in FIGURES 1, 2 and 3.

The coarse threads 21 in the enlarged chamber 19, are complemental to exterior threads 22 provided on an enlarged diameter 23 of an end-thrust member 24 consisting of an elongated square shank 24 extending from one end of the enlarged end-thrust member diameter or shoulder 23 and a comparatively short cylindrical shank 25 on the other end of the stud engaging thrust member 24. The cylindrical bottom shank 25 corresponds with and in operation confronts the stud end 14 for engagement axially therewith. To this end, the bottom shank 25 is somewhat smaller in diameter than the stud end 14 so that its chamfered end 26 will be free to move in and out of the threaded axial bore 18 of the driven member 17. The square shank 24 of the end thrust member 24, is provided with a pin receiving aperture 27 therethrough for alignment and registry with a correspondingly sized aperture 28 provided diametrically through the wall 29 of a cylindrical sleeve 30 for the reception of an elongated pin 31 which extends therethrough while the square shank thrust member 24 is disposed within a correspondingly shaped and somewhat larger square channel 32 provided axially through the sleeve 30 for assembled retention and turning movement or rotation therewith through the medium of the connecting pin 31 (FIGURE 6).

The sleeve 30 corresponds in diameter with the driven tubular member 16 and is end or axially aligned therewith so that the end thrust member 24 will be in threaded connection through the complemental threads 21–22 so that rotation of the driver sleeve 30 will cause corresponding rotation of the thrust member 24 therewith to axially displace the latter toward or away from the stud end 15 depending upon the directional rotation of the sleeve 30. The linear axial displacement of the end thrust member 24 is comparatively limited and serves to cause the stud end 15 to be axially engaged by the lower short shank 25 to effect a tight engagement therebetween and an effective end pressure which together with the thread connection 14–18 therebetween sets up thread friction which securely holds the stud gripped by the driven and driver sleeves or couplers 16–30, respectively.

To establish a driving connection between the sleeve couplers 16–30, complemental and intermeshing clutch dogs 33–34 extending radially on the meeting circumferential or peripheral edges of the driven and driver sleeve couplers 16–30 to provide somewhat wider dog receiving alternate spaces 33′–34′ which require free rotation of approximately 15 to 20 degrees therebetween upon reversal prior to establishing contact with the opposite faces of the clutch dogs or bosses 33–34. This free rotation of the couplers or sleeves 16–30 permits the end-thrust member 24 to unscrew to relieve the pressure on the stud end 15 and freely permit the release of the driven coupler threads 18 from threaded engagement with the stud end threads 14. Thus, with the teachings of the present invention, two separate steps are involved in effecting the gripping of a stud or studs and effecting the release therebetween almost instantaneously and without difficulty, namely the separate end thrust engagement and disengagement together with their threaded interengagement between the stud threads 14 and the stud driver tool threads 18.

Contrasting this double action between the stud and the stud driver and/or release device, the disadvantages of the well known single unit device that provided a fixed stop between the stud end and the stud driver together with the threaded interengagement which does not take into account the fact that the stud must bind more tightly in the workpiece than in the tool or stud driver. When driving the stud, the stud screws into the tool or driver, and end pressure is exerted upon the end stop due to the angle of the stud thread. In order to release the stud from the tool or driver, the friction of the threads must be overcome and the end pressure on the stop released. This friction and end pressure is accentuated by the difference in the pitch of the threads on both ends of the stud or studs. With the threads on the free end of the stud being finer and of less pitch than the threads on the workpiece engaging stud end, there is even a much tighter lock between the stud and its driver so that an attempted release becomes very difficult and at times impossible without loosening the connection thereof in the workpiece.

Figure 3:
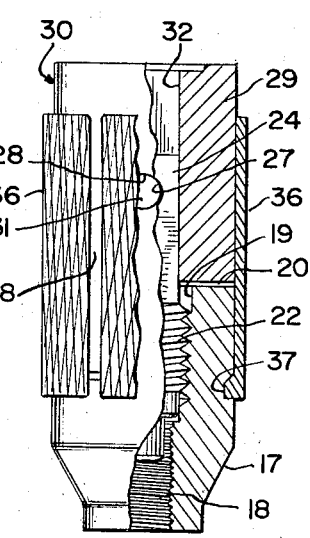
FIGURE 3 is a fragmentary sectional view of the stud driving tool embodying features of the present invention with the external sleeve shown assembled therewith.
Figure 4:
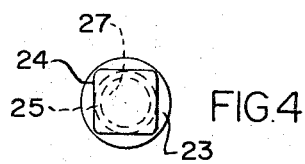
FIGURE 4 is a top plan view of the axial stud engaging member which is the axial engaging and stud release element comprising part of the improved stud driving device illustrated in the preceding figures of the drawing.

These difficulties have been entirely overcome with the teachings of the present invention which provides a separate and independently acting end thrust member to accomplish engagement and disengagement automatically responsive to the rotation between the coupler sleeves of the stud driver so that its action can be best utilized in an effective timed sequence with the threaded engaging and disengaging parts between the stud and the driver device depending upon the desired function thereof. It should be noted that the square bore 32 in the driver coupler sleeve 30 is adapted to receive the correspondingly shaped driver head of an impact driver of the power type or for that matter manual handle drivers may be resorted to for that purpose. In order to protect the user's hands and fingers from the rotating parts of the stud driver 16–30, the driven coupler sleeve 16 is provided with a circumferential V-type groove 35 to receive a longitudinally slitted sleeve cover 36 which has a circumferential interiorly extending rib 37 formed along the bottom peripheral edge thereof (FIGURE 3) for frictional engagement with the complemental coupler groove 35, thereby permitting relative rotation between the sleeve cover 36 and the rotating couplers 16–30. The sleeve cover or collar 36 is slitted as at 38 to provide for sufficient resiliency therein for insertion over the couplers 16–30 and positioning retention between the peripheral groove 35 and the collar 36 internal and confronting rib 37.

It should be observed that a stud driver and automatic release therefor may embody the teachings of the present invention for left hand as well as right hand threaded studs. While the preferred illustration was confined to the right handed threaded stud, the same function and result can be attained for left-handed stud threads. This can be accomplished by merely reversing the inclination of the threads embodied in the stud driver and release mechanism, namely the threads 18, 21 and 22 which contribute to the function attributed to the structure described supra. With the structure and arrangement of parts described herein, the end thrust element 24 and its response to the rotation of the driven coupler sleeve 16 to establish end pressure upon the engaged stud 10 for tightening the stud 10 into a workpiece responsive to clockwise rotation (viewed from the upper end thereof) and the release of the end pressure through the elevation of the thrust member 24 responsive to counterclockwise rotation of the coupler sleeve 16, provides an improved and much more effective stud driver than heretofore attainable. This is accomplished without the control of the user so that manual intervention is not necessary nor desirable in accomplishing the function thereof.

While I have illustrated and described a preferred embodiment of the invention, it must be understood that my invention is capable of considerable variation and modification without departing from the spirit of the invention. I, therefore, do not wish to be limited to the precise details of construction set forth, but desire to avail myself of such variations and modifications as come within the scope of the appended claims.

I claim:

1. A stud driver comprising driver and driven couplers, stud engaging threads in said driven coupler, stud end thrust means extending between said driver and driven couplers, separate means between said end thrust means and said driven coupler for displacing said end thrust means toward and away from said stud engaging threads responsive to the relative directional rotation of said driver and driven couplers, and loosely interfitting clutching means between said driver and driven couplers to provide for initial limited relative rotation therebetween and subsequent positive rotary engagement for rotation in unison in either direction.

2. A stud driver comprising driver and driven couplers as defined in claim 1 wherein the displacing end thrust means comprises a threaded elongated polygonal member meshing with complemental threads in said driven coupler for longitudinal displacement in said driver and driven couplers while experiencing limited relative rotation in either direction.

3. A stud driver defined in claim 2 wherein the threaded elongated member has different pitch threads than said stud engaging threads for effecting axial linear displacement in said driver coupler responsive to its rotation in said driven coupler.

4. A stud driver defined in claim 3 wherein said stud end thrust means has a threaded shank for engagement with the driven coupler and a polygonal shank complemental to a polygonal bore in said driver coupler to insure axial longitudinal displacement therebetween.

5. A stud driver defined in claim 4 wherein said driver and driven couplers has loosely interfitting clutching means which afford rotary play therebetween to actuate said end thrust means prior to any reaction between said driven coupler and the stud threads.

6. A stud driver defined in claim 1 wherein said driver and driven couplers have loosely interfitting clutching means on their confronting peripheral edges affording rotary play therebetween to actuate said end thrust means relative to the stud prior to any reaction between said driven coupler and the stud engaging threads.

References Cited

UNITED STATES PATENTS

| | | | |
|---|---|---|---|
| 1,125,186 | 1/1915 | Schneider | 81—535 |
| 2,641,948 | 6/1953 | Braendel | 81—535 |
| 2,949,800 | 8/1960 | Neuschotz | 81—535 |
| 3,290,968 | 12/1966 | Parnock et al. | 81—535 |

JAMES L. JONES, JR., *Primary Examiner.*